United States Patent [19]
Shimizu

[11] Patent Number: 6,105,464
[45] Date of Patent: Aug. 22, 2000

[54] HOUSING FOR AN AXLE DRIVING APPARATUS

[75] Inventor: Hiroaki Shimizu, Amagasaki, Japan

[73] Assignee: Kanzaki Kokyukoki Mfg. Co., Ltd., Hyogo-ken, Japan

[21] Appl. No.: 09/157,519

[22] Filed: Sep. 21, 1998

Related U.S. Application Data

[63] Continuation-in-part of application No. 08/730,057, Oct. 15, 1996, Pat. No. 5,809,845.

[30] Foreign Application Priority Data

Apr. 4, 1996 [JP] Japan ..................................... 8-82767

[51] Int. Cl.[7] .............................. F16H 57/02; F16H 57/04
[52] U.S. Cl. ......................... 74/606 R; 184/2.65; 60/454
[58] Field of Search ......................... 74/606 R; 184/6.25; 210/222, 223; 123/196 A; 60/454

[56] References Cited

U.S. PATENT DOCUMENTS

| | | | |
|---|---|---|---|
| 2,622,699 | 12/1952 | Mills | 184/6.25 X |
| 3,744,244 | 7/1973 | Swoager | 60/454 |
| 3,800,914 | 4/1974 | Miyata | 184/6.25 |
| 4,278,928 | 7/1981 | Griffiths et al. | 475/159 X |
| 4,348,864 | 9/1982 | Ichimura et al. | 60/454 |
| 4,539,865 | 9/1985 | Yoneda et al. | 74/606 R |
| 4,773,995 | 9/1988 | Kondo | 210/222 |
| 4,784,013 | 11/1988 | Yamaoka et al. | 74/606 R |
| 4,922,765 | 5/1990 | Hayakawa et al. | 74/467 X |
| 4,995,971 | 2/1991 | Droste et al. | 74/606 R X |
| 5,092,196 | 3/1992 | Kameda et al. | 74/606 R |
| 5,127,287 | 7/1992 | Taniguchi et al. | 74/606 R |
| 5,146,748 | 9/1992 | Okada | 74/606 R X |
| 5,259,194 | 11/1993 | Okada | 475/83 X |
| 5,311,740 | 5/1994 | Shiba et al. | 74/60 X |
| 5,373,697 | 12/1994 | Jolliff et al. | 60/454 |
| 5,440,951 | 8/1995 | Okada et al. | 74/606 R |
| 5,617,764 | 4/1997 | Komura et al. | 74/606 R |
| 5,809,845 | 9/1998 | Shimizu | 74/606 R |

*Primary Examiner*—Charles A Marmor
*Assistant Examiner*—Ha Ho
*Attorney, Agent, or Firm*—Sterne, Kessler, Goldstein & Fox P.L.L.C.

[57] ABSTRACT

A housing for an axle driving apparatus which is partitioned therein through an inner wall into a first chamber for housing therein a hydrostatic transmission and a second chamber for housing therein a drive train for transmitting power outputted from the hydrostatic transmission to axles. An oil filter is disposed between the first chamber and the second chamber. The first chamber and the second chamber are filled with oil which can flow between the first chamber and the second chamber through an oil filter, whereby the volume of oil, which varies as the temperature of the oil in the first chamber rises or lowers, can be adjusted.

12 Claims, 15 Drawing Sheets

HOUSING FOR AN AXLE DRIVING APPARATUS

REFERENCE TO RELATED APPLICATION

This application is a Continuation-in-Part of application Ser. No. 08/730,057; filed Oct. 15, 1996, the disclosure of which is incorporated in its entirety by reference hereto now U.S. Pat. No. 5,809,845.

BACKGROUND OF THE INVENTION

It is well-known to provide an axle driving apparatus which houses therein a hydrostatic transmission (hereinafter referred to as an "HST") and a drive train for transmitting power from an output shaft of the HST to the axles. In such a case, it is common to provide a chamber in the housing in which the HST is located and a separate chamber in the housing in which the drive train and axles are located. The two chambers are partitioned from each other to prevent foreign objects, such as iron powder from the drive train, from entering into the HST chamber. Such a technique is disclosed in, for example, U.S. Pat. No. 5,440,951.

In that patent, the housing is partitioned into a first chamber for housing the HST and a second chamber for housing the drive train, such as a differential gear unit. A reservoir is formed in the upper portion of the housing to communicate with the first chamber and also with the second chamber. Oil fills the housing through an oil port provided in the reservoir.

In such construction, when the HST is working, the volume of oil in the first chamber is increased as the temperature of the oil in the first chamber increases and the increased oil enters into the reservoir. Conversely, when the volume of oil in the first chamber decreases, the oil returns into the first chamber from the reservoir. Air bubbles created in the oil in the second chamber by rotation of the drive train are collected in the reservoir. As a result, there is a possibility that foreign objects, such as iron powder, will flow together with the air bubbles and enter into the reservoir from the second chamber. In which case, oil contaminated by the foreign object in the reservoir enters from the reservoir into the first chamber. Foreign objects in the first chamber can enter into slidably rotatable portions of the HST, which can promote wear of the HST. Although the foreign object entering the first chamber is removed by an oil filter before being supplied as operating oil to the HST, the oil filter is quickly clogged and as a result, must be changed more often. Because it is very troublesome to change the oil filter, it is desired to have the period between oil filter changes as long a possible.

FIELD OF THE INVENTION

The present invention relates to an axle driving apparatus, and more particularly to an axle driving apparatus housing in a common housing an HST and axles, in which the housing is partitioned into a chamber for housing the HST and a chamber for housing a power transmission unit for the axles, so that oil in both chambers freely flows therebetween.

SUMMARY OF THE INVENTION

An object of the present invention is to provide an axle driving apparatus which is designed so that the interior of a housing, which forms an oil sump therein, is partitioned into a first chamber containing therein the HST and a second chamber containing therein a drive train for transmitting power of the HST to the axles. An oil filter is disposed between the first chamber and the second chamber so that both chambers can communicate oil to each other through the oil filter between them. When the HST is working, the temperature of the oil is raised in the first chamber which increases the volume of the oil therein. Some of the excess volume of oil is transferred into the second chamber, thereby adjusting the volume of oil in the first chamber. Conversely, when the oil volume in the first chamber is decreased due to the lowering of the oil temperature in the first chamber, the oil in the second chamber returns into the first chamber so that the first chamber is always filled with oil. Since the oil flowing into the first chamber is filtered by the oil filter, foreign objects never enter into the first chamber and as a result do not adversely affect operation of the HST. The oil filling the housing functions as both operating oil for the HST and also as lubricating oil for the drive train so that only one kind of oil is sufficient to fill housing.

In a preferred embodiment, a third chamber is provided for housing the oil filter. This third chamber is positioned across the inner wall of the housing in the upper portion of the housing. A first communicating bore which communicates the first chamber with the third chamber and a second communicating bore which communicates the second chamber with the third chamber are both covered by the oil filter.

Also, in a preferred embodiment, oil communicates between the first and second chambers through a separate oil filter. Oil in the first chamber positively circulates to the second chamber, where the temperature of the oil in the first chamber is maintained lower, thereby improving the operating efficiency of the HST.

These and other objects of the invention will become more apparent in the detailed description and examples which follow.

DETAILED DESCRIPTION OF THE PREFERRED EMBODIMENTS

Figure 1:
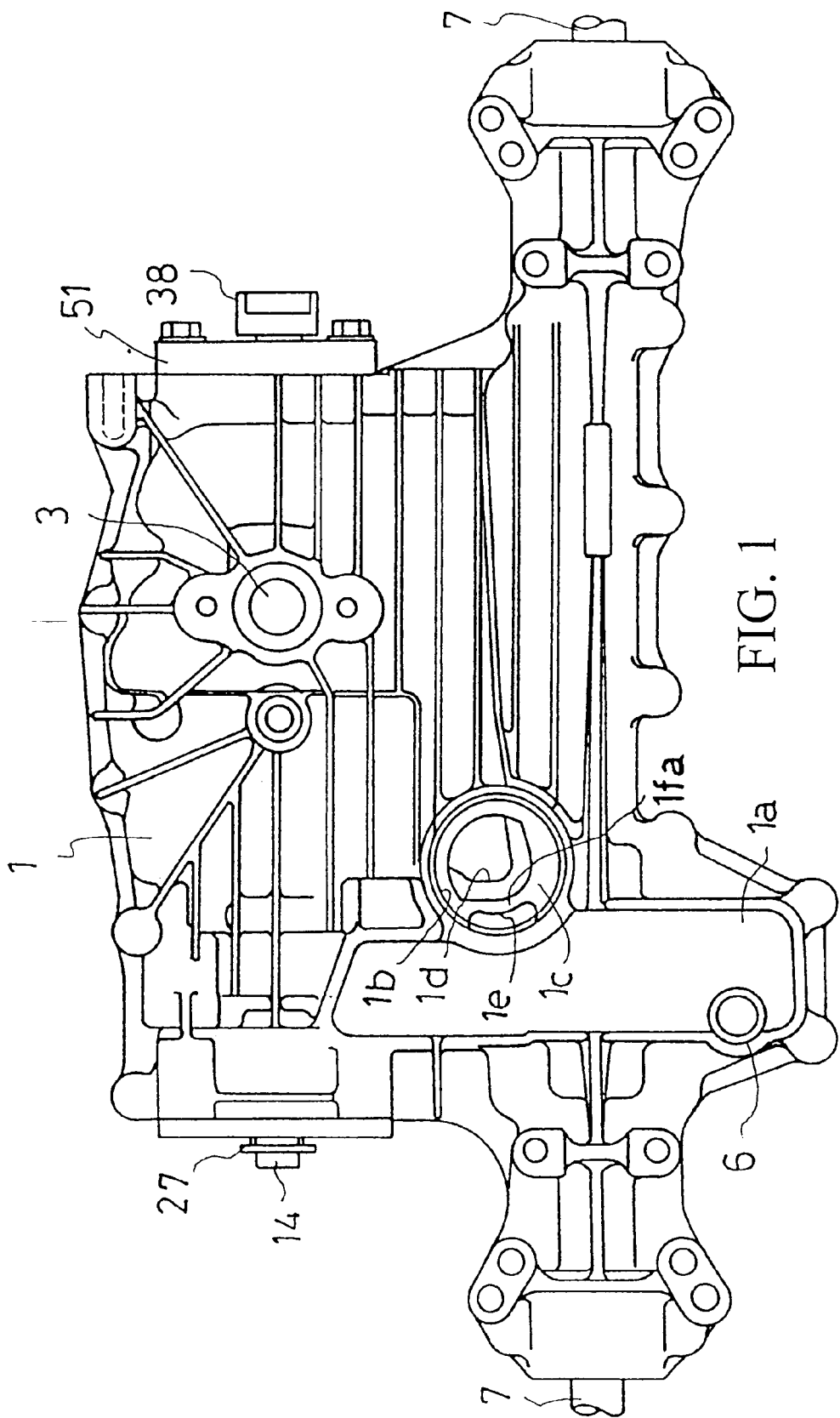
FIG. 1 is a plan view of an axle driving apparatus of the invention.
Figure 6:
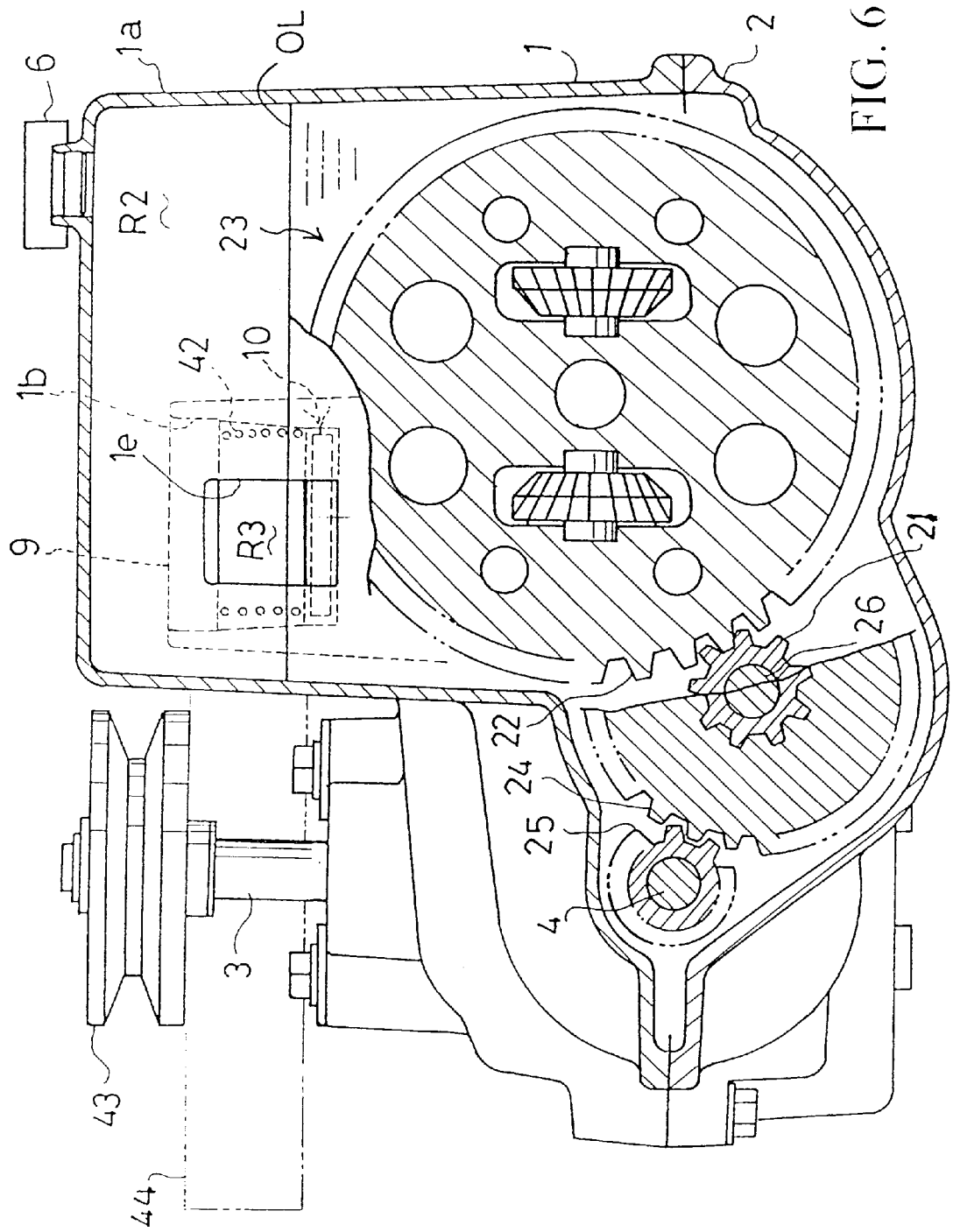
FIG. 6 is a sectional view looking in the direction of the arrows D—D in FIG. 2.

Explanation will now be given on an entire axle driving apparatus of the present invention in accordance with FIGS. 1, 2 and 3. A housing for the axle driving apparatus comprises an upper half housing 1 and a lower half housing 2 which are jointed to each other by horizontally flat surfaces at the peripheral walls of each half housing. A bearing for an output shaft of an HST, to be discussed below, is provided at the joint surface of the housing. Bearings for axles 7 are shifted upwardly from the joint surfaces and are disposed in the upper half housing 1. Axles 7 are rotatably supported by upper housing 1 through the bearings. A counter shaft 26, which is disposed between an output shaft 4 and axles 7, extends in parallel thereto. As shown in FIG. 6, counter shaft 26 is shifted below the joint surface of the housing and is supported by bearings disposed between upper half housing 1 and lower half housing 2. Thus, axles 7 are disposed at a side of upper half housing 1 above the joint surfaces. Conversely, counter shaft 26 is disposed at a side of lower half housing 2 below axles 7. Output shaft 4 is disposed at the joint surfaces. While output shaft 4 is interlockingly connected in a driving manner with axles 7 through a drive train (to be discussed below), the horizontal distance between shaft 4 and axles 7 is shortened and the longitudinal length of the housing is reduced, so that the axle driving apparatus is more compact. Axles 7 are differentially coupled to each other by a differential gear unit 23 and project laterally outwardly at opposite ends of the housing.

Figure 7:
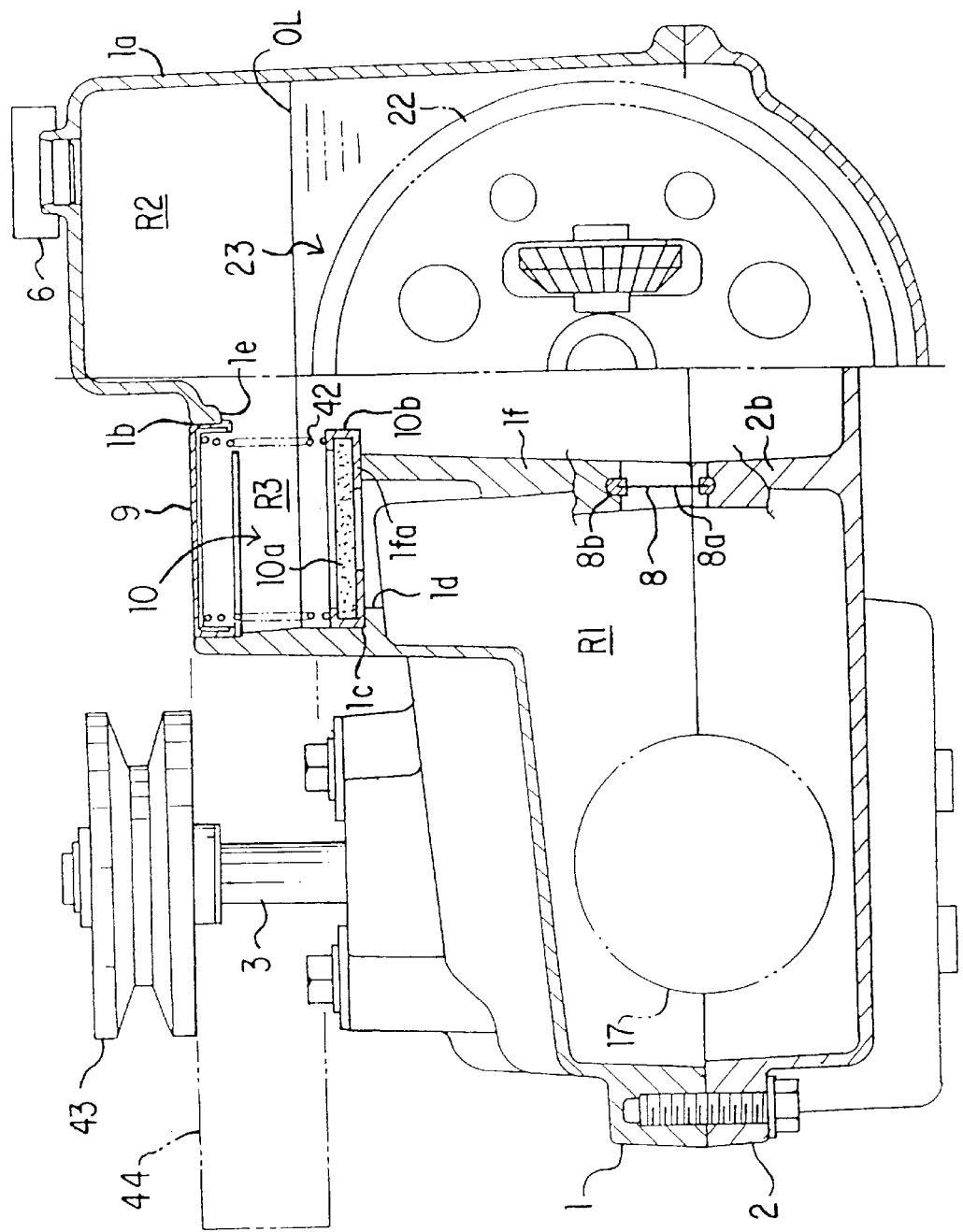
FIG. 7 is a sectional view looking in the direction of the arrows E—E in FIG. 2.

The housing is partitioned by an inner wall into a first chamber RI for housing the HST and a second chamber R2 for housing axles 7 and the drive train, comprising differential gear unit 23 and gears for transmitting to the differential gear unit 23 power from output shaft 4. The inner wall, as shown in FIG. 7, comprises an inner wall portion If which extends downwardly from the upper inner surface of upper half housing 1 and is positioned at an end surface on an equal level to the joint surfaces of the housing. An inner wall portion 2b projects upwardly from the inner bottom surface of lower half housing 2 and is positioned at an end surface on an equal level to the joint surface of the housing. The lower end surface of inner wall portion 1f and the upper end surface of inner wall portion 2b come into close contact with each other so as to form the inner wall. The first chamber R1 and the second chamber R2 are each provided with an oil sump as discussed below.

Figure 2:
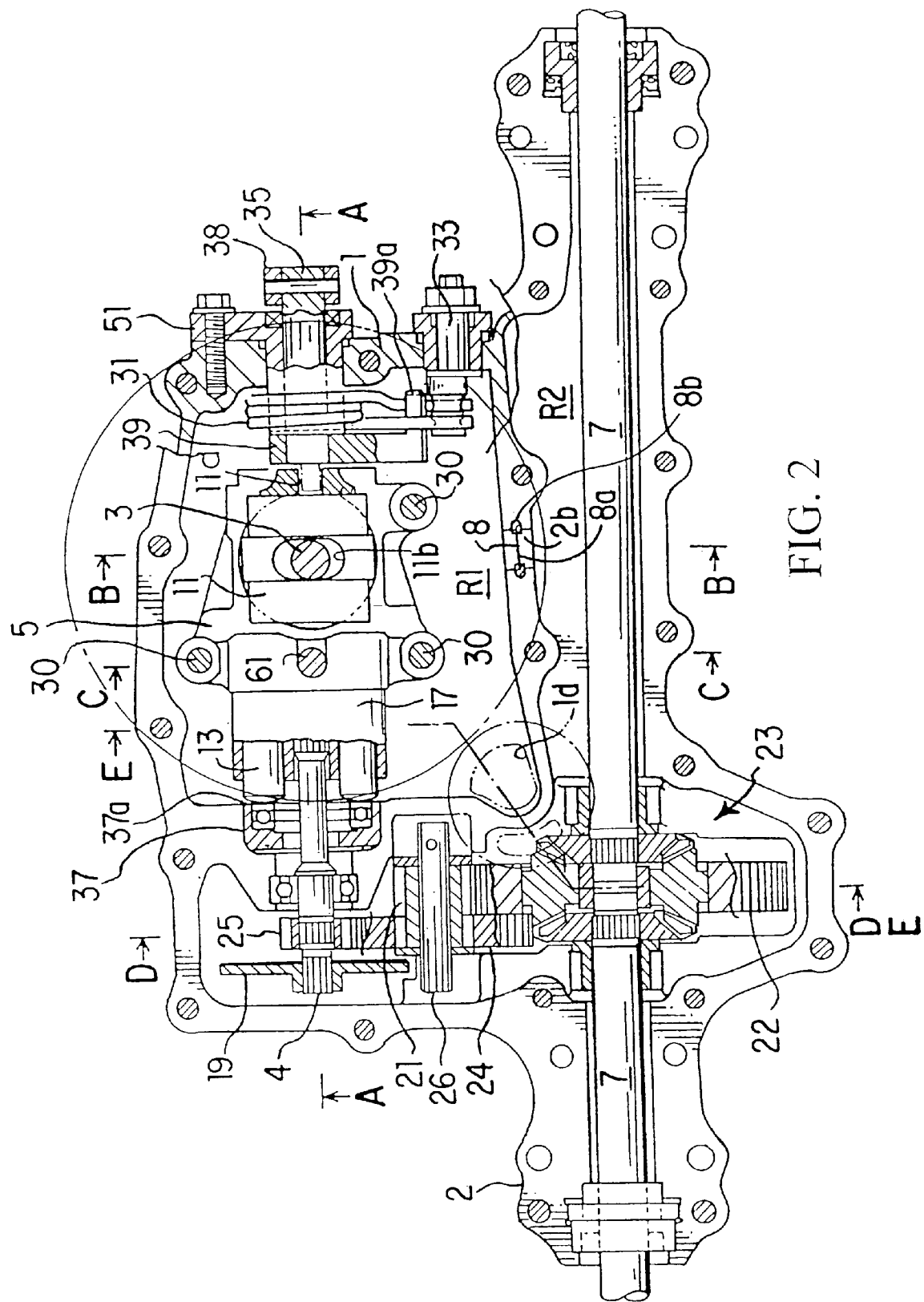
FIG. 2 is a partially sectional plan view of the same, from which an upper half housing is removed.

Referring to FIG. 2, in first chamber RI, a center section 5 which is L-like shaped when viewed in cross section, is fixed to upper half housing 1 by bolts 30. On the upper surface of a horizontal portion of center section 5 is formed a pump mounting surface. A cylinder block 16 is slidably disposed on the pump mounting surface. Pistons 12 are fitted into a plurality of cylinder bores formed in cylinder block 16. Pistons 12 are movable reciprocally through biasing springs. A thrust bearing 11a of a movable swash plate 11 abuts against the heads of pistons 12. An opening 11b is formed at the center of movable swash plate 11. Input shaft 3 perforates through opening 11b. Input shaft 3 is vertically disposed along the rotary axis of cylinder block 16 creating an axial piston type variable displacement hydraulic pump. The upper end of input shaft 3 projects upwardly and outwardly from the upper wall of upper half housing 1. An input pulley 43 and a cooling fan 44 are disposed on input shaft 3. Input pulley 43 receives power through a belt transmitting mechanism (not shown) from a prime mover (not shown) disposed on the vehicle.

At the side surface of a vertical portion of center section 5 is formed a motor mounting surface on which a cylinder block 17 is rotatably slidably disposed. A plurality of pistons 13 are reciprocally movably fitted through biasing springs into a plurality of cylinder bores in cylinder block 17. The heads of pistons 13 abut against a thrust bearing 37a of a fixed swash plate 37, which is fixedly sandwiched between upper half housing 1 and lower half housing 2. Output shaft 4 is horizontally disposed on the rotary axis of cylinder block 17 and is retained in a non-rotatable fashion creating an axial piston type fixed displacement hydraulic motor. A pair of arcuate shaped ports are open at the pump mounting surface of center section 5 so that feed and discharge oil is introduced to the ports from cylinder block 16. A pair of arcuate ports 41a and 41b are open at the motor mounting surface so that the feed and discharge oil from cylinder block 16 is introduced to ports 41a and 41b.

Figure 5:
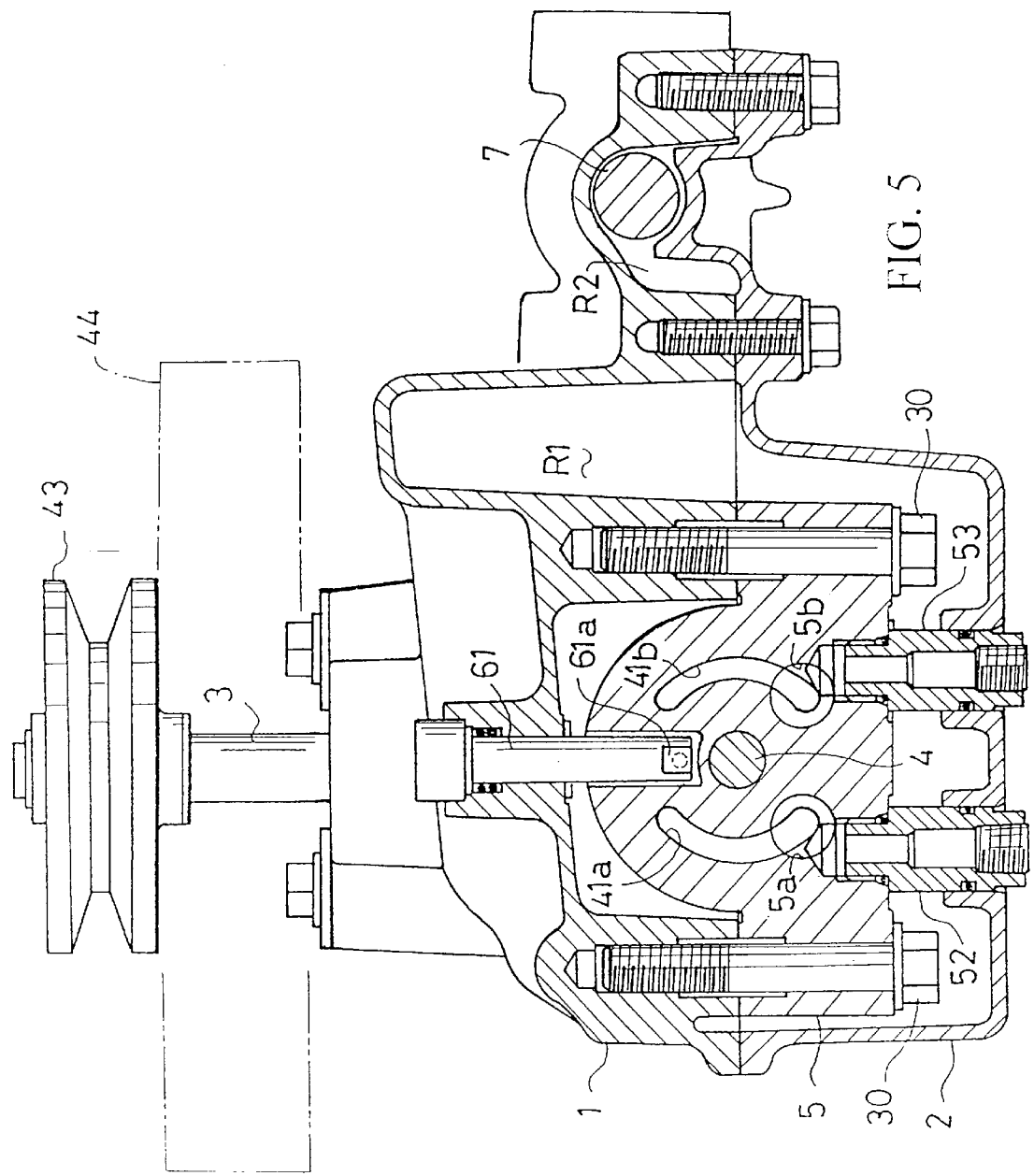
FIG. 5 is a sectional view looking in the direction of the arrows C—C in FIG. 2.

As best seen in FIG. 5, within center section 5 are bored oil passages 5a and 5b for connecting the arcuate ports on the pump mounting surface and the arcuate ports 41a and 41b on the motor mounting surface, respectively, so as to constitute a closed fluid circuit for circulating operating oil between the hydraulic pump and the hydraulic motor, creating a stepless speed changeable HST. As seen in FIG. 2, output shaft 4 is rotatably supported across the interior of first chamber R1 and second chamber R2 by means of bearing bores provided at the vertical portion of center section 5 and by sealing bearings held to the inner wall of the bearing.

The drive train for interlockingly connecting output shaft 4 and axles 7, as shown in FIGS. 2 and 6, is provided on output shaft 4 positioned in second chamber R2 with a gear 25 which engages with a larger diameter gear 24 on counter shaft 26. A smaller diameter gear 21 mounted on counter shaft 26 engages with a ring gear 22 of differential gear unit 23. A smaller diameter tubular gear 21 extends lengthwise in the direction of the rotary axis of the shaft 26 and a part of the external teeth of gear 21 engage with a center bore of larger diameter gear 24 so as to connect both gears 21 and 24 with each other. The smaller diameter gear 21, which disposes thereon the larger diameter gear 24, is fitted freely on counter shaft 26. Ring gear 22 drives differential gear unit 23 so that power is transmitted therethrough from output shaft 4 to the left and right axles 7.

A brake disc 19 is fixed onto one end of output shaft 4 positioned in second chamber R2. As shown in FIG. 3, a brake pad 29 is mounted at the inside surface of upper half housing 1 opposite to an upper portion of one side surface of brake disc 19. At the inside surface of upper half housing 1 opposite to the other side surface of brake disc 19 is horizontally disposed a brake operating shaft 14 which perforates through a cylindrical bush 15 from the exterior of upper half housing 1 to the interior thereof and is axially slidably supported. The end surface of brake pad 29 and the inside surface of brake operating shaft 14 are opposite to each other. Brake disc 19 is disposed therebetween. Brake operating shaft 14 is disposed in parallel to output shaft 4. A brake arm 27 is fixed to one end of brake operating shaft 14 outside the housing. A spring 28 is fitted onto the same so as to bias brake operating shaft 14 in a direction away from brake disc 19.

Figure 3:
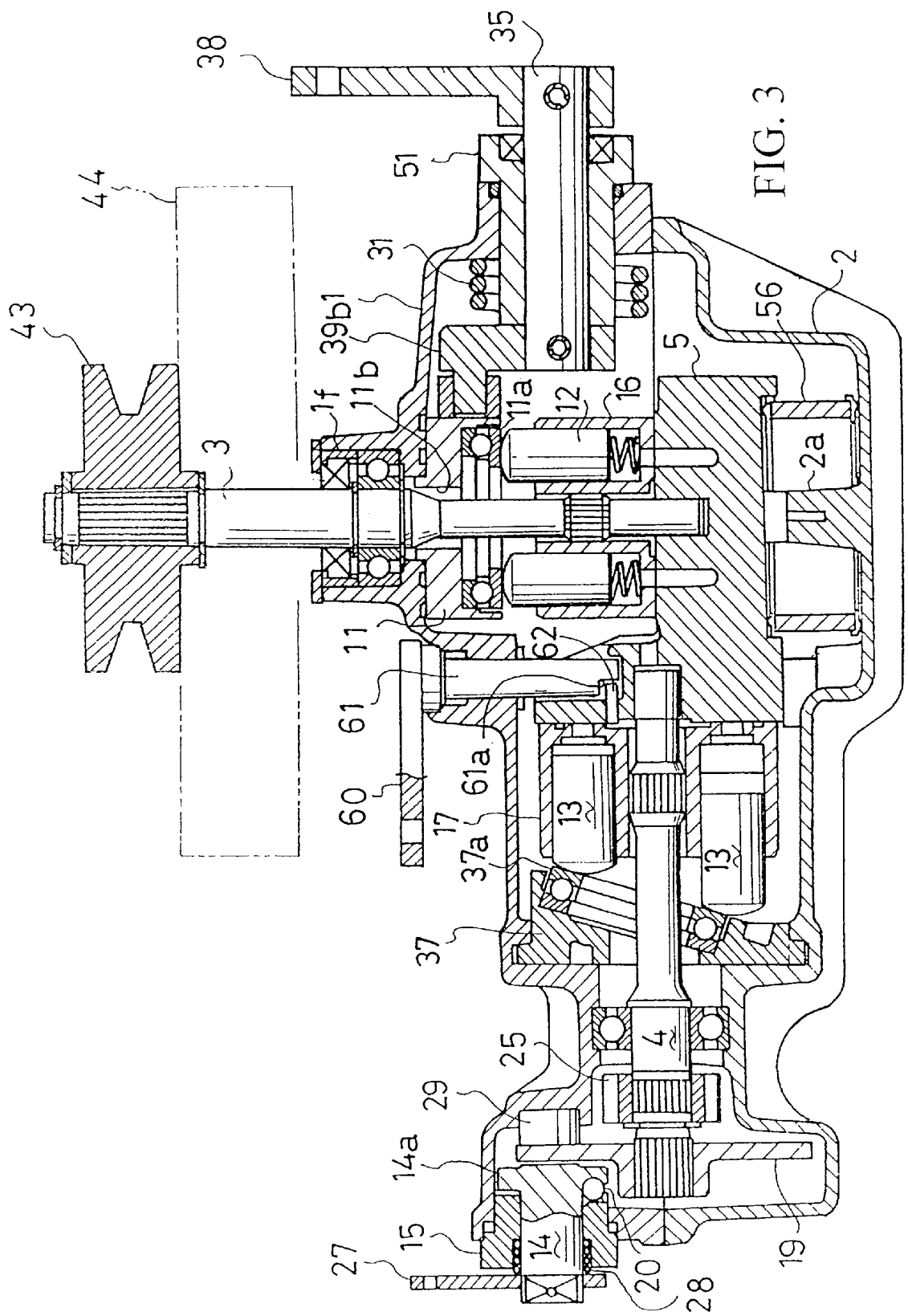
FIG. 3 is a sectional view looking in the direction of the arrows A—A in FIG. 2.

As shown in FIG. 3, a flange 14a is formed at one end of brake operating shaft 14 within the housing. A plurality of circumferentially extending cam grooves are provided at the surface of flange 14a opposite to the inner end surface of bush 15. Recesses opposite to the cam grooves are provided at the inner end surface of bush 15 so that balls 20 are interposed between the recesses and the cam grooves. In such construction, when brake arm 27 is rotated around the brake operating shaft 14, balls 20 held in the recesses, gradually ride onto the shallowest portions from the deepest portions of the cam grooves, whereby brake operating shaft 14 slides toward brake disc 19, which is urged between the inner end surface of brake operating shaft 14 and brake pad 29 so as to exert a braking action onto output shaft 4.

In order to provide operating oil to the closed fluid circuit after the axle driving apparatus is built, as shown in FIG. 5, oiling pipes 52 and 53 communicating with oil passages 5a and 5b are created from the lower surface of the horizontal portion of center section 5 Lower ends of oiling pipes 52 and 53 are exposed outwardly from the bottom of lower half housing 2. The opening ends of the same are closed by plugs after the operating oil is provided to the closed circuit.

Figure 4:
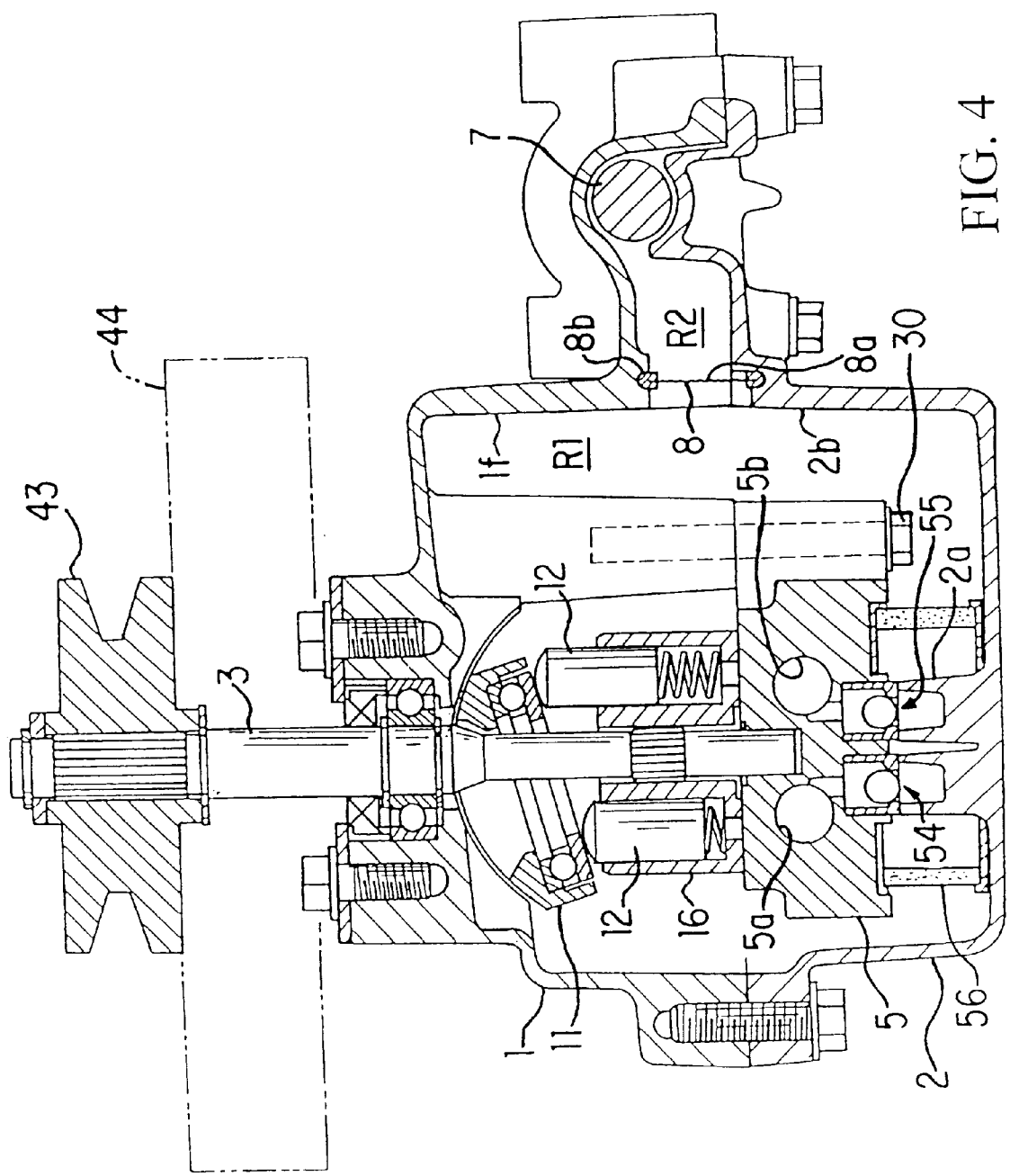
FIG. 4 is a sectional view looking in the direction of the arrows B—B in FIG. 2.

As shown in FIG. 4, oil bores are branched outwardly toward the lower surface of the horizontal portion of center section 5 from the intermediate portion of oil passages 5a and 5b. Check valves 54 and 55 for supplying operating oil are disposed at the open ends of the oil bores. The end surface of check valves 54 and 55 come into contact with the upper ends of projections 2a formed on the inner bottom surface of lower half housing 2 so as to be locked thereto. The ball-like valve bodies of check valves 54 and 55 close the openings provided in the bottom of the valve casing by the weight of the balls. When the operating oil flowing in the low pressure side of the closed fluid circuit of the HST becomes inadequate, the valve body of check valve 54 or 55 floats upwardly from the bottom of the valve.

At the upper end surface of each projection 2a is formed a groove which is open at both ends thereof at the outer periphery of projection 2a. An annular oil filter 56 is disposed in the housing by surrounding the projections 2a. Sealing members are fitted onto the upper edge and lower edge of oil filter 56 and come into close contact with the lower surface of the horizontal portion of center section 5 and the inner bottom surface of lower half housing 2, thereby partitioning the oil sump in first chamber R1 into the outside and inside of filter 56. Hence, when the closed fluid circuit therein is at negative pressure, the check valve 54 or 55 is open and the oil filtered by oil filter 56 is introduced into the closed fluid circuit. The oil filter 56 is made of an annular-shaped piece of molded porous material such as cellulose or other porous material, or of a mesh material made of woven fine iron or other metal wires.

As shown in FIGS. 3 and 5, a by-pass arm 60 is disposed at the upper portion of upper half housing 1 in order to open the closed fluid circuit in the oil sumps for enabling axles 7 to be idling when the vehicle is hauled, for example. In other words, by-pass arm 60 is fixed at the base thereof to an upper end of a by-pass shaft 61 which is vertically journaled to the upper wall of upper half housing 1 and extends at the lower end thereof into the vertical portion of center section 5. A stepped portion 61a is formed at the lower end of by-pass shaft 61. A push pin 62 is positioned at the vertical portion of center section 5 slightly above the center of the motor mounting surface, between arcuate ports 41a and 41b, and are slidable in the direction of the rotating axis of cylinder block 17 so as to enable push pin 62 to abut at one end against the rear surface of cylinder block 17 in close contact with the motor mounting surface, and abut at the other end against the stepped portion 61a of the by-pass shaft 61.

In such construction, when the vehicle is to be hauled, an operator operates the by-pass operating lever outside the housing. As a result, by-pass arm 60 rotates by-pass shaft 61. Stepped portion 61a at the lower end of by-pass shaft 61 pushes push pin 62 toward the rear of cylinder block 17 so as to move the rotatably sliding surface of cylinder block 17 away from the motor mounting surface. Oil passages 5a and 5b are open into the oil sump in the first chamber R1 through arcuate ports 41a and 41b, thereby enabling the output shaft 4 and axles 7 to idle.

Figure 9:
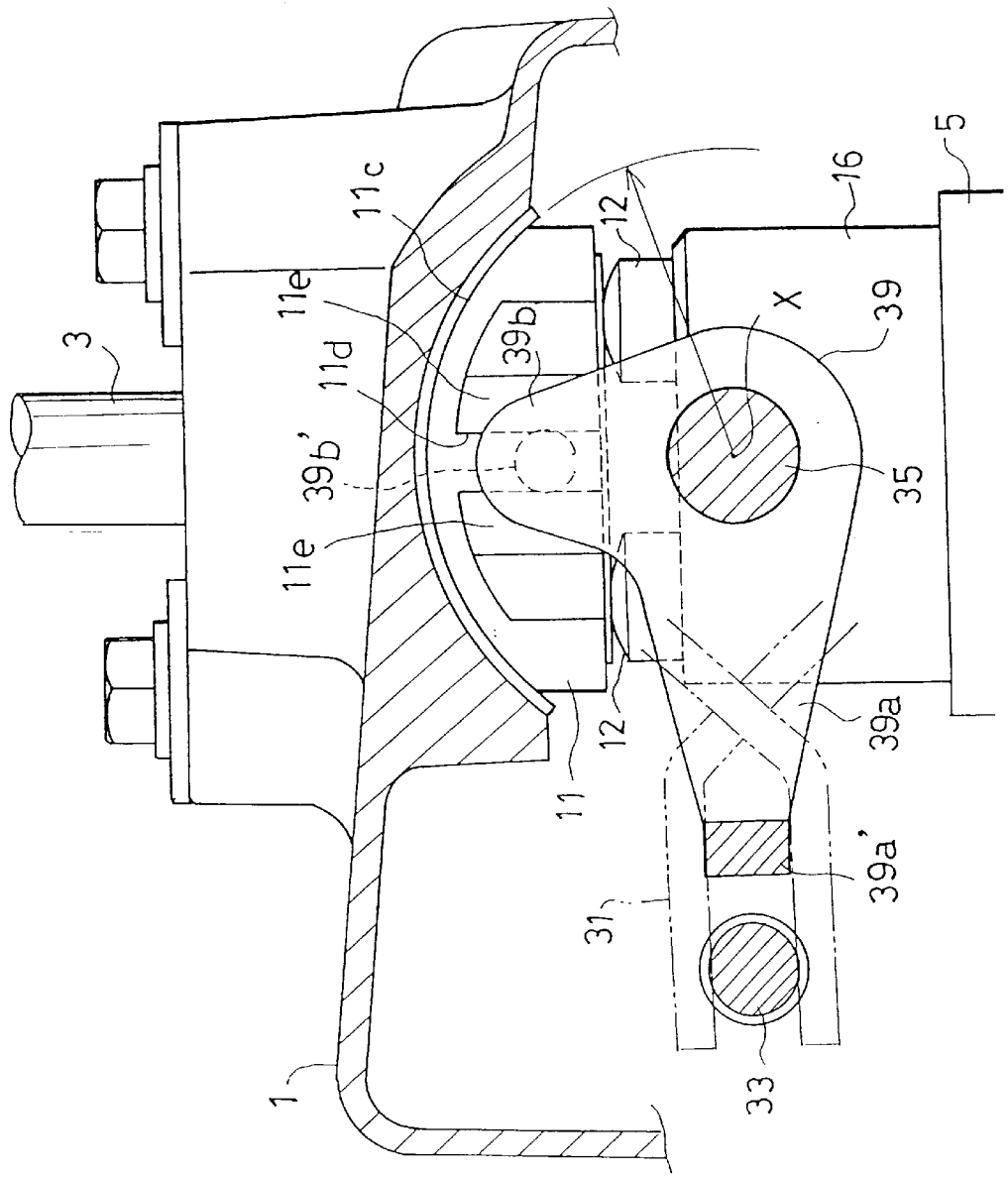
FIG. 9 is an enlarged sectional view of a principal portion of a swash plate operating mechanism for a hydraulic pump.

The piston abutting surface of movable swash plate 11 is slantingly operated with respect to the rotary axis of cylinder block 16, whereby the amount of discharge and the direction of the discharge of oil from the hydraulic pump can be varied. The movable swash plate 11 is slantingly moved by the rotation of control shaft 35. The control shaft 35, as shown in FIGS. 2 and 3, is rotatably supported in cylindrical bush 51 mounted on the side wall of upper half housing 1. The rotary axis of the same is disposed horizontally and in parallel to output shaft 4. At one end of control arm 35 outside the housing is fixed a control arm 38 for slantingly operating movable swash plate 11 from the exterior of the housing. The control arm 38 is connected to a control rod (not shown) which can be pushed and pulled longitudinally of the vehicle body and is connected to a speed change operating member, such as a lever or a pedal, provided in the vehicle. A swinging arm 39 is fixed onto the other end of control shaft 35 in the housing and comprises a first arm 39a and second arm 39b radially extending from control arm 35 as shown in FIG. 9. Movable swash plate 11 is of a cradle type. A convex circular or arc-shaped surface 11c is formed at the rear surface of swash plate 11 and is adapted to slide along a concave circular or arc-shaped surface formed on the upper surface of upper half housing 1. Since the center of curvature of the convex surface of movable swash plate 11 is set on the rotational axis of control shaft 35, an engaging portion 39b' provided at the utmost end of second arm 39b can directly engage with an engaging groove 11d provided on the side surface of movable swash plate 11.

In such construction, when control arm 38 is rotated longitudinally of the vehicle body, swinging arm 39 longitudinally rotates around control shaft 35 and movable swash plate 11 is longitudinally slantingly operated, thereby changing the output of the hydraulic pump. A coiled neutral return spring 31 is fitted onto cylindrical bush 51 fitted onto control shaft 35 and crosses at both ends to extend in the direction of first arm 39a. The ends of neutral return spring 31 sandwich therebetween a fixed pin 33 mounted on the inner side surface of upper half housing 1 in the vicinity of control shaft 35. An engaging portion 39a' is provided at one end of first arm 39a.

Accordingly, when control arm 38 is rotated around control shaft 35, swinging arm 39 is also rotated and neutral return spring 31 is enlarged at one end by engaging portion 39a' and is stopped at the other end by a fixed pin 33, thereby applying to control arm 38a biasing force for returning it to the neutral position. When operation of the speed changing unit is stopped, movable swash plate 11 is returned to the neutral position and is halted there by a restoring force generated by neutral return spring 31. Fixed pin 33, as shown in FIG. 2, is provided at an extension thereof outside the housing with an eccentric adjusting screw. The adjusting screw rotates to shift fixed pin 33 therearound, whereby movable swash plate 11 can be adjusted in an accurately neutral position.

Figure 8:
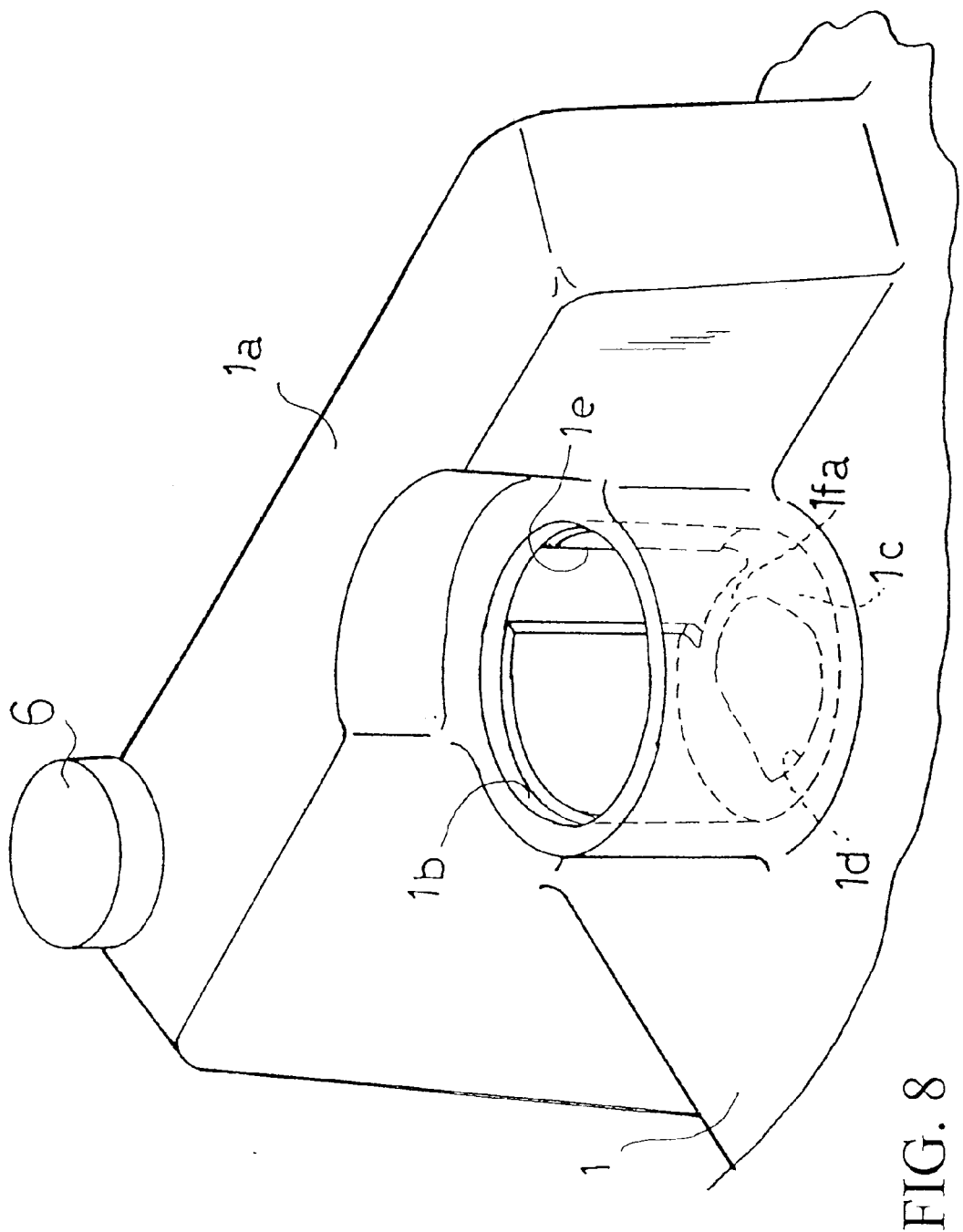
FIG. 8 is a partially perspective view of the upper wall of the upper half housing.

The first and second chambers R1 and R2, respectively of the housing of the axle driving apparatus as described above are filled with common oil so as to form oil sumps. An air reservoir, as shown in FIGS. 1, 7 and 8, is formed above differential gear unit 23 in upper half housing 1. An oiling plug 6 with a breather is mounted on the upper wall of upper half housing 1 above the air reservoir. A cylindrical portion 1b open at the upper end thereof is formed integrally with and adjacent to a form expanding area 1a at the upper wall of upper half housing 1. Portion 1b houses therein differential gear unit 23. The bottom of cylindrical portion 1b is traversed by part 1f of inner wall If of upper half housing I.

A third chamber R3 is formed in cylindrical portion 1b which is independent from the first and second chambers R1 and R2, respectively. A first communicating bore 1d is open at the bottom of cylindrical portion 1b adjacent to one side of part 1fa of inner wall portion 1f. First chamber R1 communicates with third chamber R3 through first communicating bore 1d. A second communicating bore 1e is open from the bottom of cylindrical portion 1b to the inner periphery thereof adjacent to the other side of part 1fa of inner wall 1f Second chamber R2 communicates with third chamber R3 through second communicating bore 1e. A flat filter mounting portion 1c is formed on the bottom surface in an area other than where first and second communicating bores 1d and 1e are open,. Cylindrical portion 1b and first and second communicating bores 1d and 1e can be constructed by simultaneously casting when the upper half housing 1 is molded so as to not require a separate mechanical process, such as drilling, after the housing half is molded.

Cylindrical portion 1b is hollow. Oil filter 10 to be disposed on filter mounting portion 1c comprises a single filter body 10a which is disc-like shaped and a sealing material 10b which is ring-like-shaped and formed of rubber material fitted onto the outer peripheral edge of filter body 10a. Throughout the inner periphery of sealing material 10b is formed an annular groove deep enough to cover the outer periphery of filter body 10a. The diameter of oil filter 10, where sealing material 10b covers filter body 10a, is equal to the inner diameter of cylindrical portion 1b. Therefore, when oil filter 10 is mounted onto filter mounting portion 1c, the outer peripheral surface of sealing material 10b comes into close contact with the inner surface of cylindrical portion 1b. Cylindrical portion 1b has a lid 9 mounted at the opening end thereof and seals third chamber R3. A spring 42 is interposed between oil filter 10 and lid 9 so as to bias oil filter 10 toward filter mounting portion 1c. Thus, one side surface of sealing material 10b always comes into close contact with filter mounting portion 1c so as not to create a gap therebetween so that oil filter 10 functions reliably. Oil filter 10 comes into contact at the lower surface thereof with first chamber R1 through the opening end of first communicating bore 1d and at the upper surface thereof with third chamber R3.

After the axle driving apparatus is constructed, oiling plug 6 mounted onto the upper wall of upper half housing 1, as shown in FIG. 7, is removed and the housing is filled with oil through the opening for plug 6. When second chamber R2 is filled with oil, any oil overflowing from second communicating bore 1e fills first chamber R1 through communicating bore 1d. When the housing is filled with oil, oil filter 10 is not yet placed into third chamber R3. Oil filter 10 is placed in the housing after the housing is filled with oil, thereby enabling the housing to be filled with oil more quickly.

The amount of oil to fill the housing is sufficient to immerse the HST and bearings of the drive train. The level of oil shown in the drawings 0L is somewhat higher than the mounting portion of oil filter 10. An air reservoir OS formed above oil level 0L. The oil in first chamber R1 and in second chamber R2 can communicate with each other through first communicating bore 1d and second communicating bore 1e through oil filter 10. The oil in the housing can function as operating oil for the HST in the first chamber R1 and as lubricating oil for the gears and bearings of the drive train in second chamber R2.

When the HST is working, the temperature of the oil is increased causing the volume of the oil in first chamber R1 to also increase. Some oil escapes from first chamber R1 into second chamber R2 through first and second communicating bores 1d and 1e so as to adjust the oil level in first chamber R1. When the HST stops working and the temperature of the oil in first chamber R1 is lowered, the volume of the oil is also lowered. Then, the oil flows in the reverse direction from within second chamber R2 into first chamber R1, at which time any foreign objects, such as iron powder which can be harmful to the HST, is filtered by oil filter 10 so as to not enter into first chamber R1. Thus, oil filter 10 keeps the oil in first chamber R1 constantly clean. When oil filter 10 is clogged with oil or contaminated, lid 9 mounted to cylindrical portion lb can be removed therefrom to enable spring 42 and oil filter 10 to be taken out through the upper opening of cylindrical portion 1b, thereby facilitating maintenance of the unit.

As shown in FIGS. 2, 4 and 7, semi-circular shaped cutouts are formed at predetermined positions on the lower end surface of inner wall portion 1f of upper half housing 1 and on the upper end surface of the inner wall portion of lower half housing 2 corresponding to the semi-circular shaped cutout in wall 1f These cutouts are jointed to form one communicating bore into which an oil filter 8, in addition to oil filter 10 is fixedly sandwiched between inner wall portions If and 2b. Oil filter 8 comprises a single disc-like-shaped filter body 8a and a ring-like-shaped sealing member 8b made of rubber or the like, which is fitted into the peripheral edge of body 8a and brought into close contact with the whole circumference of the communicating bore. Oil filter 8 is provided to enable the oil in the first and second chambers R1 and R2 to communicate with each other.

The oil temperature in first chamber R1 is apt to be relatively higher than the oil temperature in the second chamber R2 because the HST works at a higher rotation speed and under higher negative pressure than the gears. Therefore, the oil in the first chamber R1 flows, due to an expansion of the volume of oil, into second chamber R2 through oil filter 10. In this case, since the interior of second chamber R2 communicates with first chamber R1 through oil filter 8, first chamber R1 and second chamber R2 can positively circulate the oil therebetween. Thus, a temperature difference in the oil in first and second chambers R1 and R2 can be reduced, whereby a rise in the temperature of the oil in the first chamber R1 can be relatively restricted to be low so as to improve the operating efficiency of the HST.

As mentioned above, the housing of the axle driving apparatus of the present invention is constructed so that the housing forming therein the oil sump is partitioned by the inner wall into a first chamber R1 housing therein the HST and a second chamber R2 housing therein the drive train for transmitting power outputted from the HST to the axles. Oil filter 10 is disposed at a portion of the inner wall across from first chamber RI and second chamber R2. Oil in both chambers R1 and R2 can flow through oil filter 10 between first and second chambers R1 and R2. When the HST is working and causes the temperature of the oil in first chamber R1 to rise which causes the volume of the oil in the first chamber R1 to increase, some of the oil can escape into second chamber R2 so as to adjust the oil volume in second chamber R2. Conversely, when the temperature of the oil in first chamber R1 is lowered thereby reducing the volume of oil in first chamber R1, the oil in second chamber R2 returns into first chamber R1, thereby enabling first chamber R1 to always be filled with oil. Oil flowing into first chamber R1 from second chamber R2 is filtered by oil filter 10 so that even if any foreign objects enters into first chamber R1, the HST is not adversely affected. The oil in the housing functions as both the operating oil for the HST in first chamber R1 and as lubricating oil for the drive train in second chamber R2, whereby one kind of oil is sufficient to fill the housing which results in a lower manufacturing cost.

Third chamber R3, housing therein oil filter 10, is formed at the upper wall of the housing. First communicating bore 1d for communicating first chamber R1 with third chamber R3 and second communicating bore 1e for communicating second chamber R2 with third chamber R3 are covered with oil filter 10. Because oil filter 10 is made as a single body, expansion of the volume of oil filling first chamber R1 can be adjusted, whereby the function of keeping the oil in first chamber R1 clean can be simplified and the apparatus can be manufactured at a low cost.

Furthermore, when in the inner wall of the housing is assembled, a separate oil filter 8 independent of oil filter 10 is provided so as to enable the oil to flow between first and second chambers R1 and R2. As a result, the oil positively circulates between first and second chambers R1 and R2. Whereby, a rise in the temperature of the oil in first chamber R1 is relatively restricted to be low, thereby improving the operating efficiency of the HST.

Alternatively, one or both of oil filters 8 and 10 may be replaced with magnets for removing chips, which are generated by chafing between gears in second chamber R2, before they are mixed in oil and flow into first chamber R1.

Figure 10:
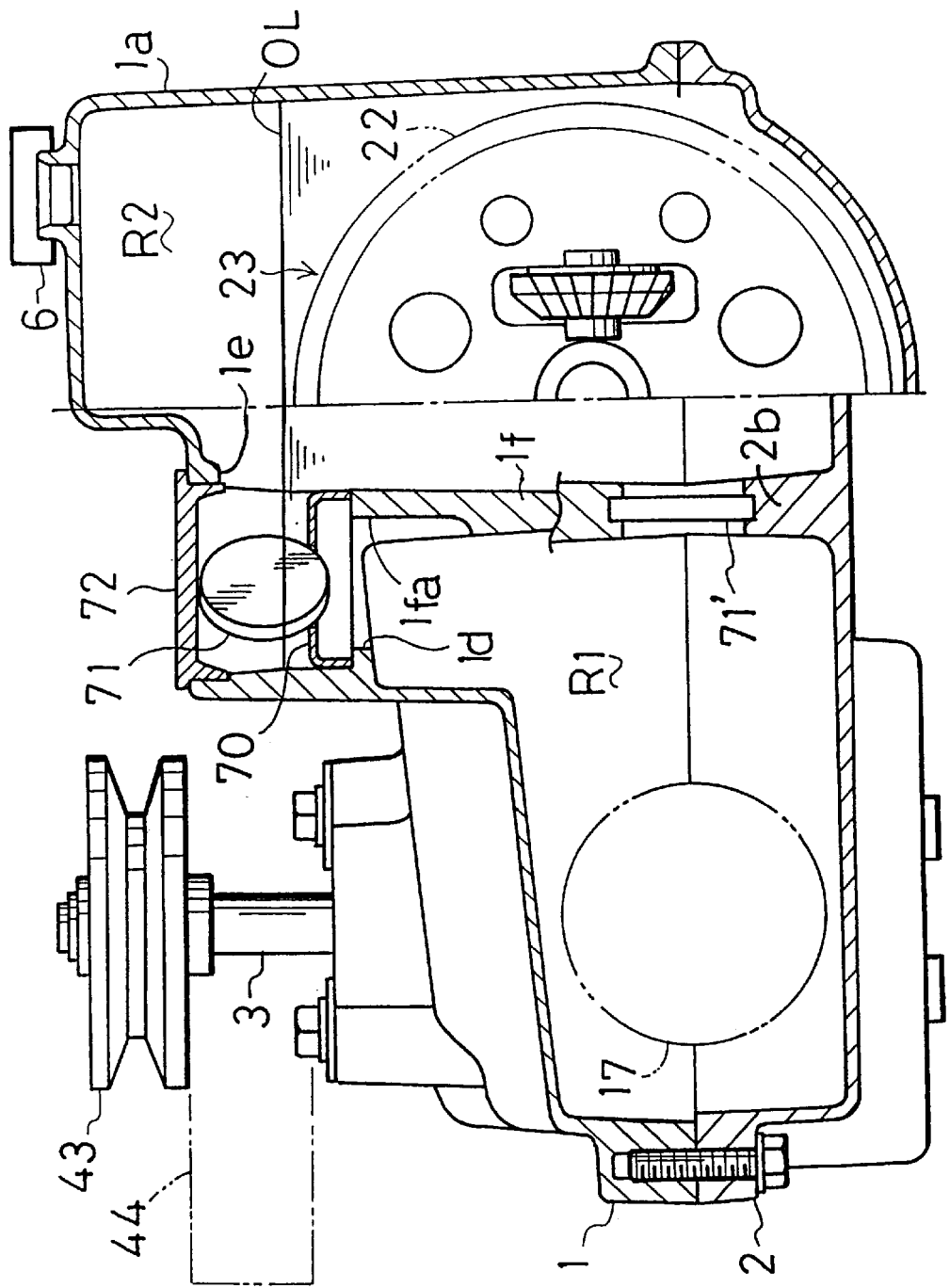
FIG. 10 is a sectional view looking in the direction of the arrows E—E in FIG. 2 utilizing a magnetic oil-cleaning assembly.

In this regard, lid 9, spring 42 and oil filter 10 are removed from third chamber R3 (cylindrical portion 1b) and replaced with a magnetic oil-cleaning assembly as shown in FIG. 10. FIGS. 11 through 14 describe embodiments of the assembly.

Figure 11:
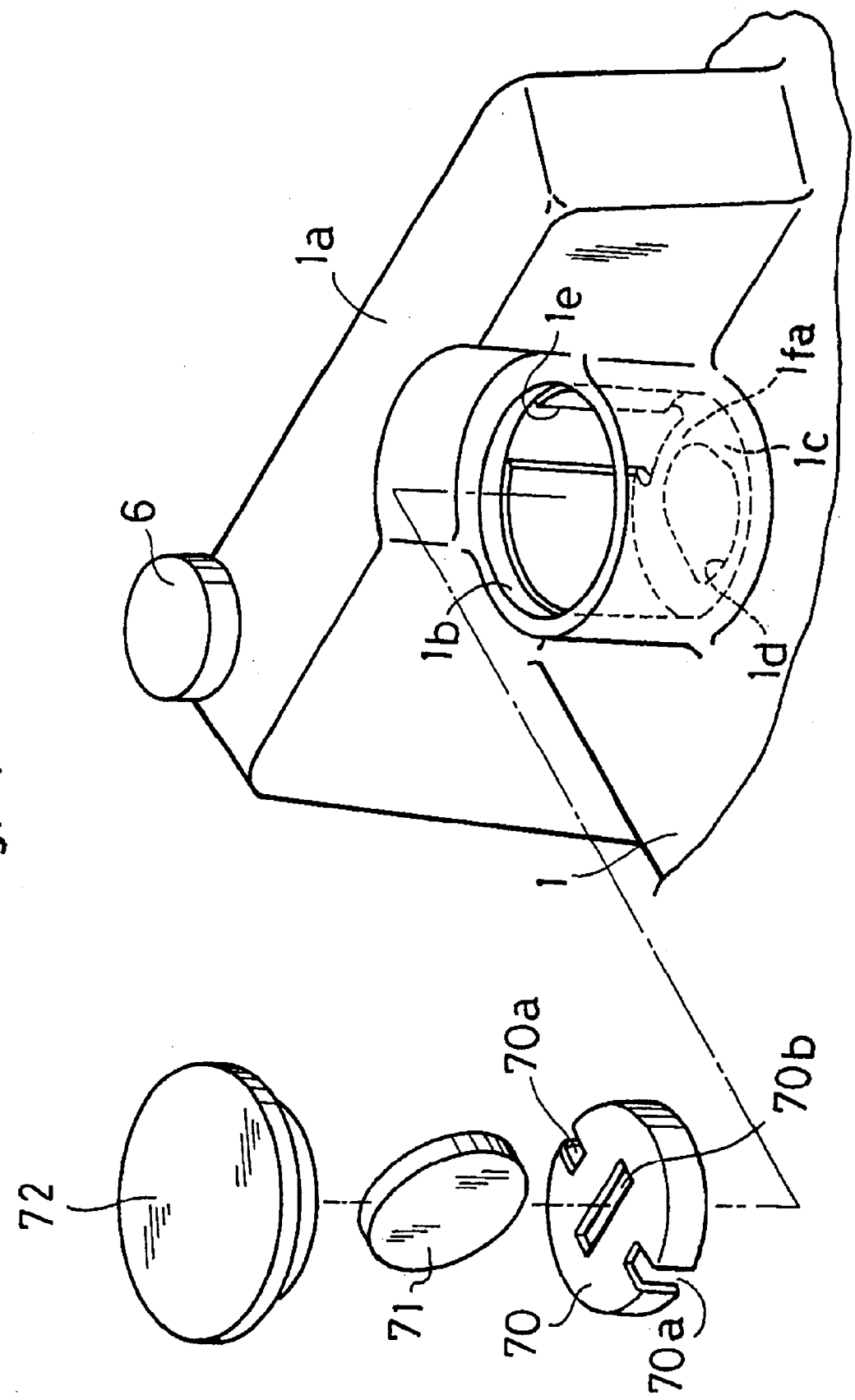
FIG. 11 is a perspective view of a first embodiment of a magnetic oil-cleaning assembly.

As shown in FIG. 11, a first embodiment of the magnetic oil-cleaning assembly consists of an upside down cup-shaped seat 70 made of an iron plate, a discoid magnet 71 and a plug (lid) 72. The same plug 72 is adapted to the various assemblies shown in FIGS. 11 through 14. Seat 70 is cut off at the peripheral foot thereof with one of more oil passages 70a and is bored through the upper plane surface thereof with a slot 70b. In this embodiment, a pair of oil passages 70a are provided in opposite to each other with respect to slot 70b. Magnet 71, whose plane surfaces are oriented vertically, is inserted downwardly into slot 70b, so that the lower end portion of magnet 71 is engaged in slot 70b. Seat 70 and magnet 71, which are fixed to each other by magnetic attraction, are inserted into cylindrical portion 1b so that seat 70 is mounted on filter mounting portion 1c in condition that one of oil passages 70a is communicated with first chamber R1 through first communicating bore 1d and the other is communicated with second chamber R2 through second communicating bore 1e.

Figure 12:
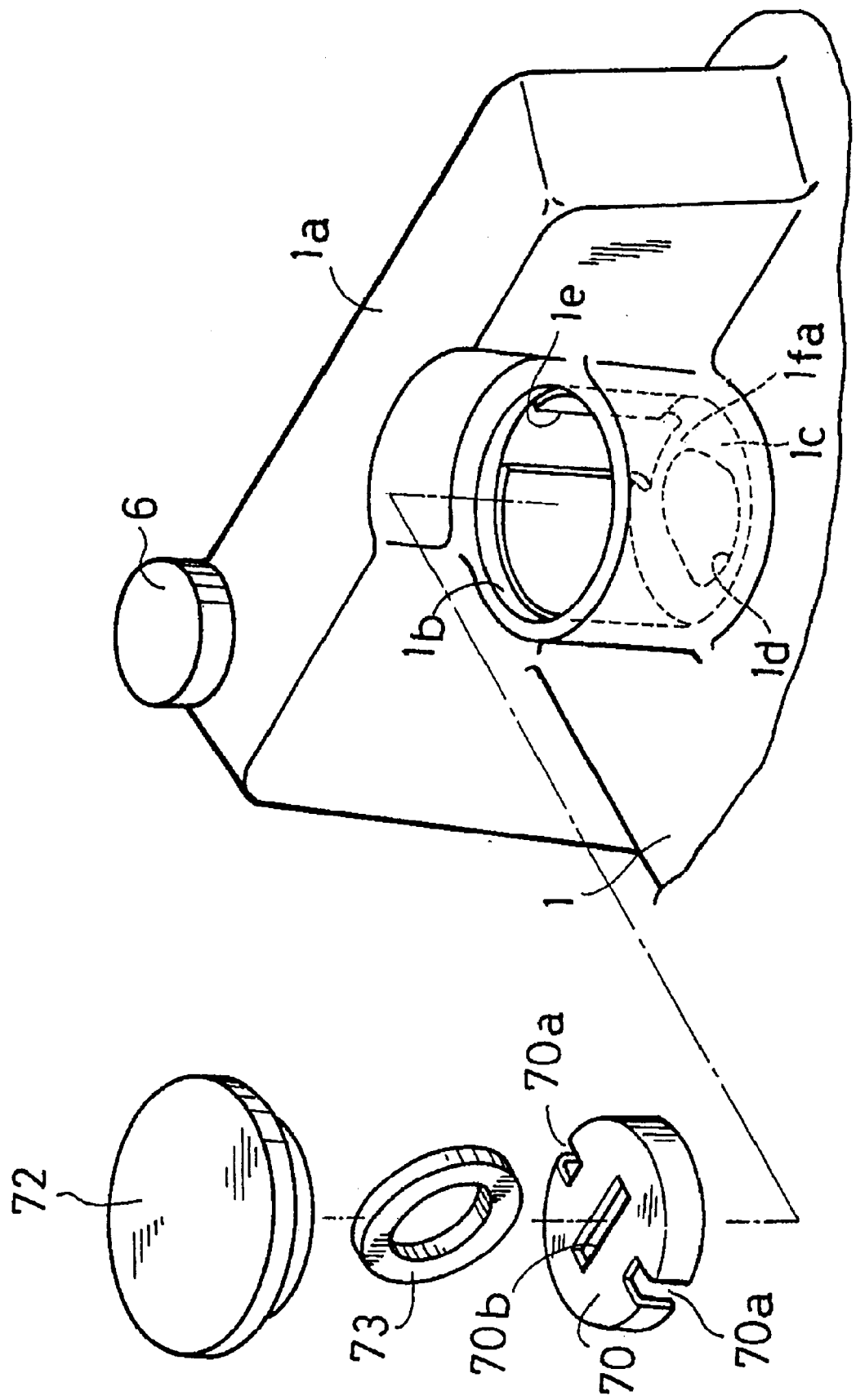
FIG. 12 is a perspective view of a second embodiment of a magnetic oil-cleaning assembly.

A second embodiment of the magnetic oil-cleaning assembly, as shown in FIG. 12, employs the same seat 70 as that shown in FIG. 10, however, discoid magnet 71 is replaced with a ring-shaped magnet 73. Magnet 73 can attract chips in oil to the inner peripheral angles thereof in addition to the outer peripheral angles thereof, thereby further improving the efficiency of cleaning oil.

Figure 13:
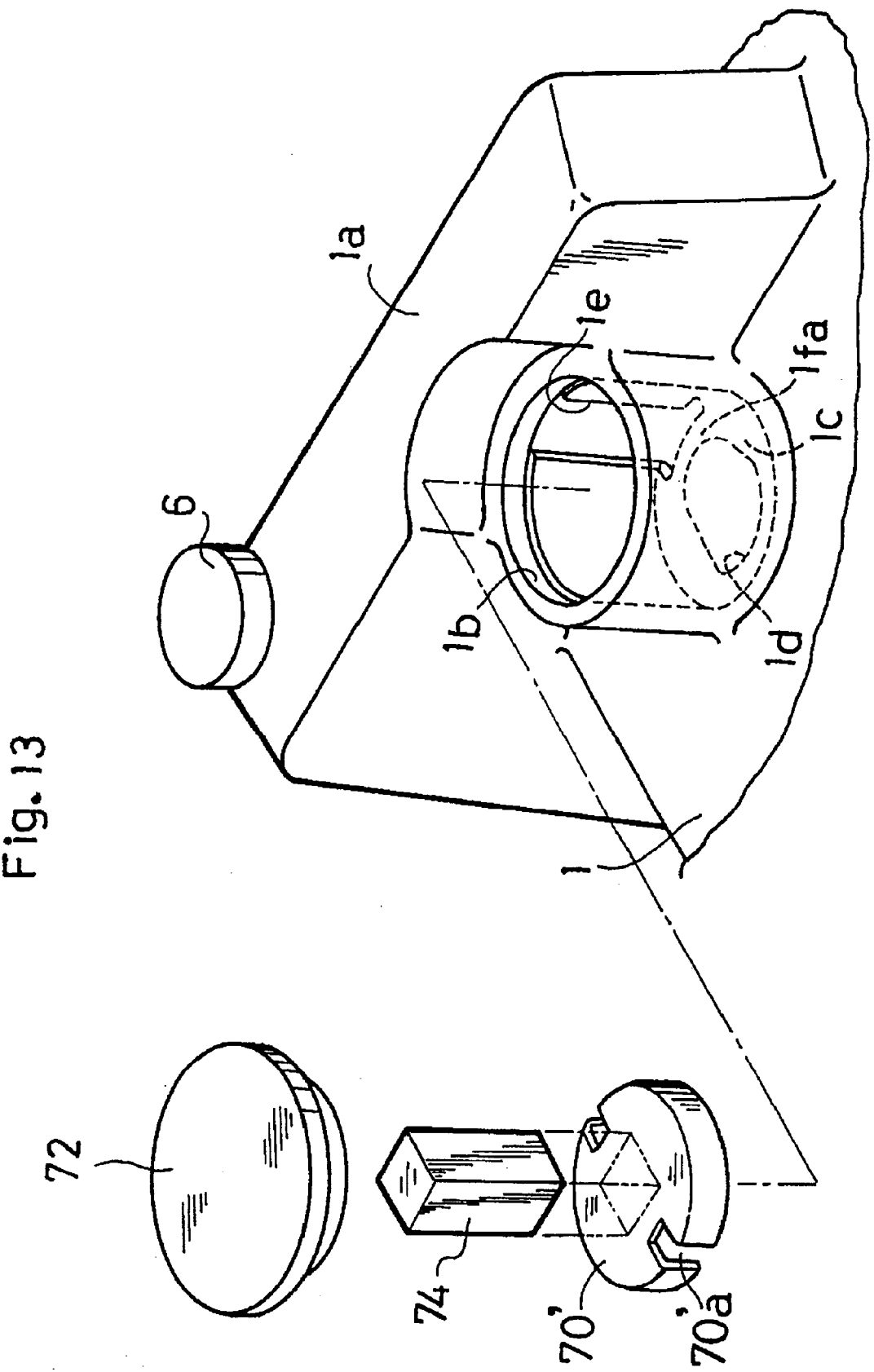
FIG. 13 is a perspective view of a third embodiment of a magnetic oil-cleaning assembly.

A third embodiment, as shown in FIG. 13, employs an iron seat 70' similar to seat 70 shown in FIG. 11 without slot 70b. A prismoidal magnet 74 is erected by magnetically attracting the bottom surface thereof to the plane surface of seat 70'.

Figure 14:
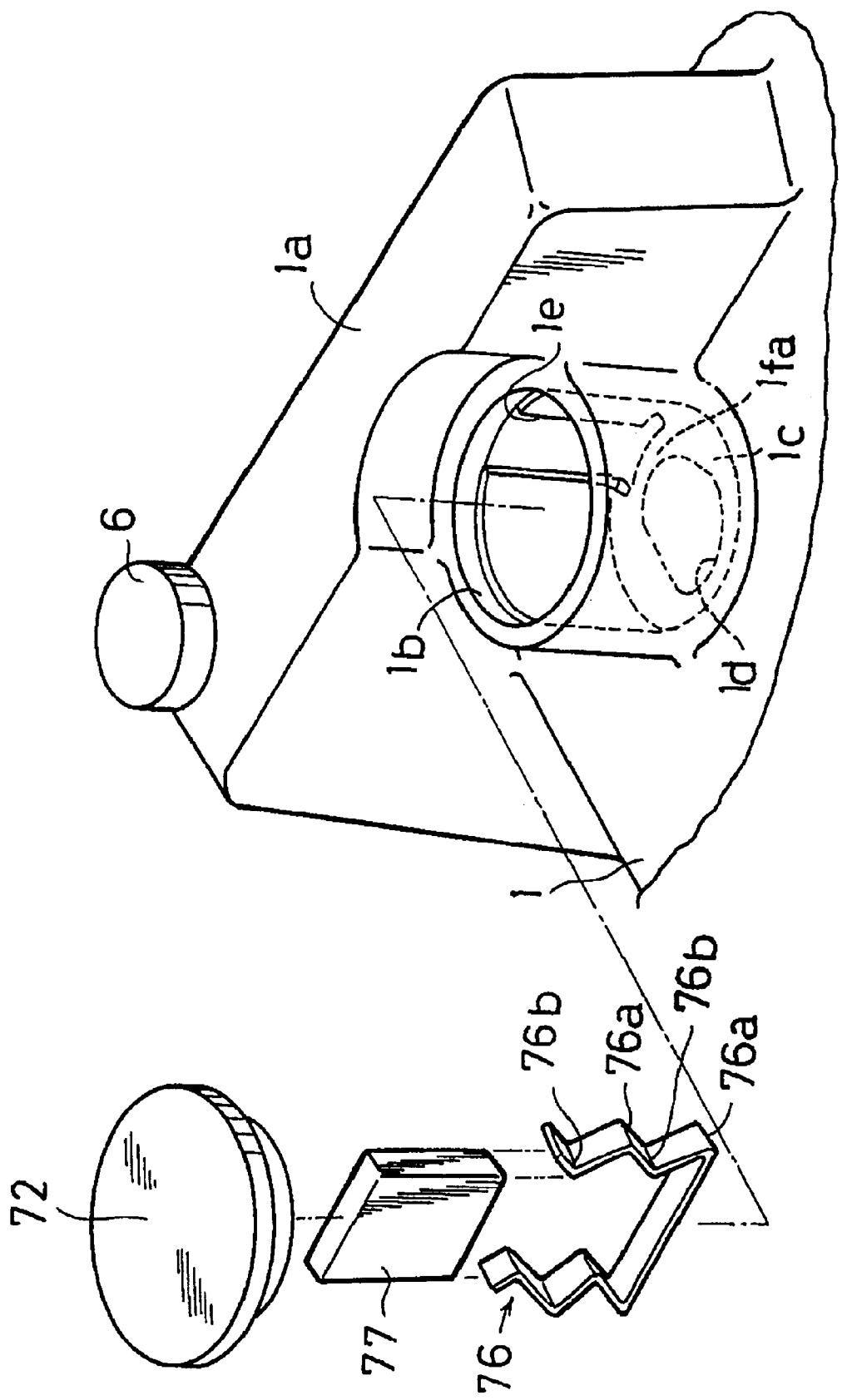
FIG. 14 is a perspective view of a fourth embodiment of a magnetic oil-cleaning assembly.

In a fourth embodiment shown in FIG. 14, a rectangular board-shaped magnet 77 is vertically caught in a seat 76 made of an iron leaf spring. Seat 76 is so constructed that two vertical zigzag portions thereof contain a horizontal straight portion thereof between. The distance between the top ends of the vertical zigzag portions is smaller than the longer width of magnet 77, whereby the vertical zigzag portions can clip magnet 77 in between in condition that inward ridges 76b of the vertical zigzag portions abut against magnet 77. In providing the assembly in the third camber R3 as shown in FIG. 14, outward ridges 76a of the vertical zigzag portions abut against the inner surface of cylindrical portion 1b. First and second communicating bores 1d and 1e are disposed opposite to each other with respect to the horizontal portion of seat 76.

When a magnetic oil-cleaning assembly is provided in third chamber R3, plug 72 is put over the upper end opening of cylindrical portion 1b so as to cover therein magnet 71, 73, 74 or 77 together with seat 70, 70' or 76 settled in cylindrical portion 1b. Then, the bottom of plug 72 abuts against the upper end of magnet 71, 73, 74 or 77 so as to stabilize erected magnet 71, 73, 74 or 77 in cylindrical portion 1b.

Any assembly of the above mentioned four embodiments allows oil to flow between chambers R1 and R2 through third chamber R3. With regard to the first embodiment, oil in third chamber R3 can flow through gaps surrounded by seat 70, magnet 71 and the inner surface of cylindrical portion 1b and gaps surrounded by plug 72, magnet 71 and the inner surface of cylindrical portion 1b, so that both oil passages 70a communicate with each other. In the second embodiment, oil can flow through the hole of magnet 73 in addition to the gaps. In the third embodiment, oil can flow through gaps surrounded by plug 72, magnet 74, seat 70' and the inner surface of cylindrical portion 1b, so that both oil passages 70'a communicate with each other. In the fourth embodiment, oil can flow through gaps surrounded by plug 72, seat 76, magnet 77 and the inner surface of cylindrical portion 1b, gaps between seat 76 and magnet 77 and gaps between seat 76 and the inner surface of cylindrical portion 1b, so that first and second communicating bores 1d and 1e communicate with each other through third chamber R3.

In any of the four embodiments, chips mixed in oil are attracted by the magnet and the seat magnetized by the magnet and are stuck to the angles and the recessed corners of the magnet and the seat. Explanation will be now given to the portions of the magnets and the seats of the respective embodiments to which the chips stick.

With regard to each of seats 70 and 70' of the first, second and third embodiments, chips are stuck to the angles and the recessed corners of oil passages 70a or 70'a and the peripheral angle between its upper plane surface and its round foot. In the first embodiment, chips stick to the two peripheral angles between the plane surface and the round surface of discoid magnet 71. In the second embodiment, chips additionally stick to the inner peripheral angles between the plane surface and the inner surface of ring-shaped magnet 73, thereby improving the efficiency of removing chips from oil. In the third embodiment, chips stick to the four vertical angles of right prismoidal magnet 74.

Additionally, in both of the first and second embodiments, chips also stick to the recessed corners formed between magnet 71 or 73 and seat 70 through slot 70b. In the third embodiment, chips also stick to the recessed corners formed between the bottom of magnet 74 and the plane surface of seat 70' and between the top of magnet 74 and the bottom of plug 72.

In the fourth embodiment, chips stick to the vertical angles of magnet 77, the angles and recessed corners of seat 76 including ridges 76a and 76b and the recessed corners formed between seat 76 and magnet 77, between seat 76 and the inner surface of cylindrical portion 1b and between magnet 77 and plug 72.

Thus, the magnet oil-cleaning assembly disposed in third chamber R3 allows oil to flow therethrough between first and second chambers R1 and R2 and attracts chips in oil while the oil flows therethrough, thereby cleaning oil.

On the other hand, as shown in FIG. 10, a discoid magnet 71', which is similar to magnet 71, may be disposed so as to cover the bore in the horizontal axial bore formed between inner wall portions 1f and 2b partitioning the interior of the housing into first and second chambers R1 and R2. In this regard, a round slot is bored in inner wall portions 1f and 2b so as to surround the horizontal axial bore. For providing magnet 71', before upper and lower half housings 1 and 2 are joined with each other, a part of the periphery of magnet 71' is engaged in a part of the slot in either inner wall portion 1f or 2b. When half housings 1 and 2 are joined with each other in this condition, the other part of the periphery of magnet 71' is naturally engaged in the other part of the slot in inner wall portion 2b or 1f. Thus, magnet 71' can be settled in the bore.

Chips in first and second chambers R1 and R2 are attracted to magnet 71' and stick to respective recessed corners formed between magnet 71' and the bore of inner wall portions 1f and 2b. Oil cannot flow between first and second chambers R1 and R2 through the bore covered with magnet 71'. Only the magnetic oil-cleaning assembly in third chamber R3 allows oil to communicate between chambers R1 and R2 as the above mentioned.

Figure 15:
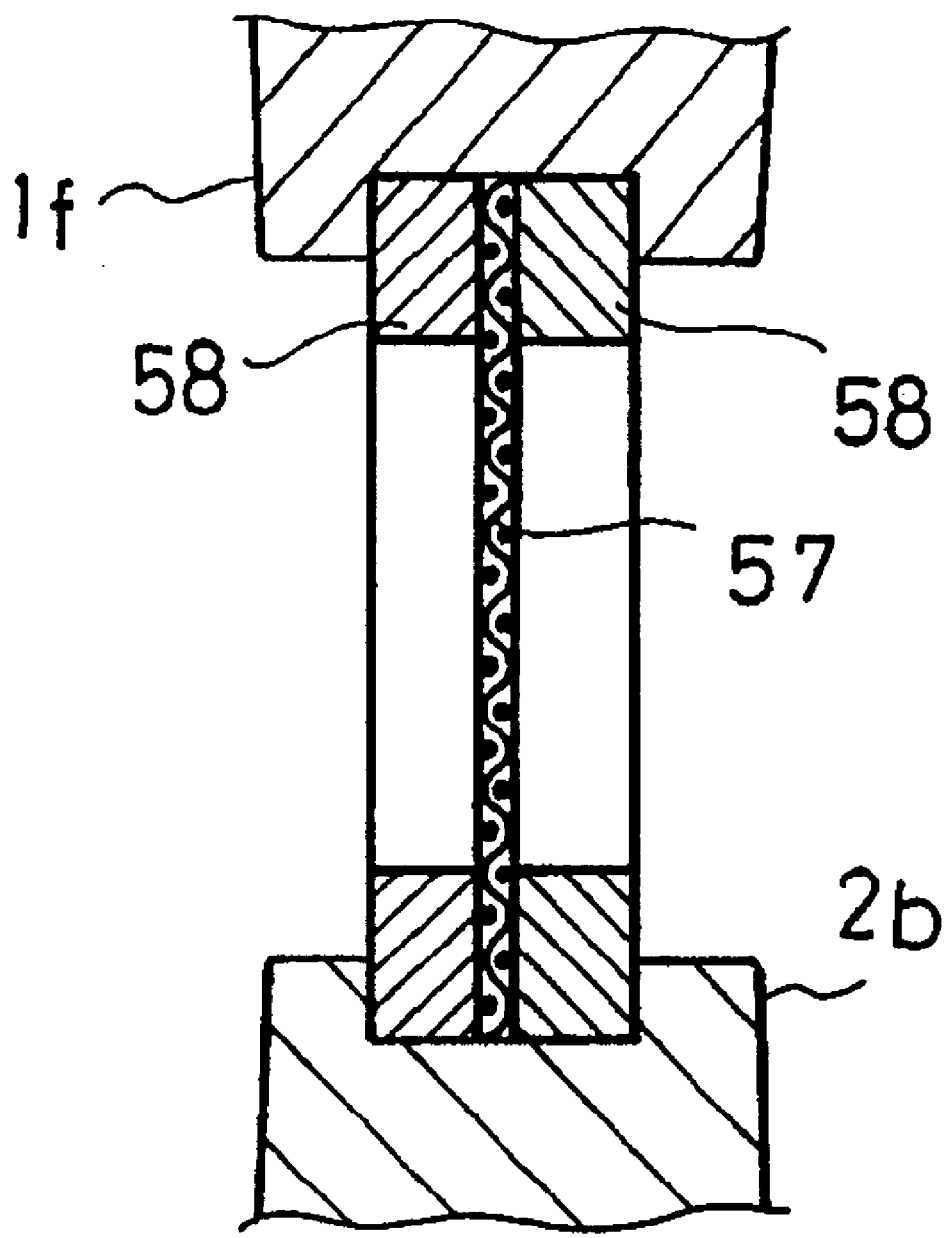
FIG. 15 is a sectional view of a magnetic oil-cleaning assembly between inner wall portions 1f and 2b.

Alternatively, as shown in FIG. 15, a magnet oil-cleaning assembly consisting of an iron circular net 57 and a pair of ring-shaped magnets 58 sandwiching net 57 between them, may be disposed in the horizontal axial bore between inner wall portions 1f and 2b. The manner of settling net 57 and magnets 58 in the bore is similar to that of settling magnet 71' shown in FIG. 10, so that the peripheries of magnets 58 and net 57 are engaged in the slot surrounding the bore.

Chips are attracted to magnets 58 and net 57 magnetized by magnets 58, so that they stick to net 57 and the angles of magnets 58 and the recessed corners formed between magnet 58 and the inner surface of the bore of inner wall portions 1f and 2b. In this embodiment, oil can flow between first and second chamber R1 and R2 through the meshes of net 57.

While a preferred embodiment of the invention has been described using specific terms, such description is for illustrative purpose only, and it is to be understood that changes and variations may be made without departing from the spirit or scope of the following claims.

What is claimed is:

1. A housing for an axle driving apparatus comprising:
   a first chamber formed in said housing for containing therein a hydrostatic transmission;
   a second chamber formed in said housing for containing therein a drive train for transmitting power outputted from said hydrostatic transmission to axles disposed in said housing;
   a third chamber formed in said housing;
   a first communicating bore for two-way communication of oil between said first chamber and said third chamber:
   a second communicating bore for two-way communication of oil between said second chamber and said third chamber: and
   a magnet disposed in said third chamber so as to attract chips in oil flowing in said third chamber.

2. A housing for an axle driving apparatus according to claim 1, wherein said magnet has a hole.

3. A housing for an axle driving apparatus according to claim 1, further comprising:
   an iron seat for settling said magnet in said third chamber.

4. housing for an axle driving apparatus according to claim 3,
   wherein said third chamber is provided on an upper wall of said housing and said seat is mounted on a bottom of said third chamber.

5. A housing for an axle driving apparatus according to claim 4, wherein said third chamber is open at an upper end thereof and a lid is provided so as to close said open upper end of said third chamber.

6. A housing for an axle driving apparatus according to claim 1, further comprising:
   another magnet disposed below said magnet.

7. A housing for an axle driving apparatus according to claim 1, further comprising:
   another magnet disposed below said magnet disposed in said third chamber, said other magnet being disposed between said first chamber and said second chamber.

8. A housing for an axle driving apparatus according to claim 1, further comprising:
   a partition wall for dividing an interior of said housing into said first chamber and said second chamber; and
   another magnet disposed in said partition wall such that outer surfaces of said other magnet face toward said first and second chambers.

9. A housing for an axle driving apparatus, comprising:
   a first chamber formed in said housing for containing therein a hydrostatic transmission;
   a second chamber formed in said housing for containing therein a drive train for transmitting power outputted from said hydrostatic transmission to axles disposed in said housing; and
   a magnet disposed between said first chamber and said second chamber and in fluid communication with oil disposed in said first and said second chambers to attract chips in the oil in said first and second chambers.

10. A housing for an axle driving apparatus according to claim 9, further comprising:
    a third chamber formed in said housing for enabling oil to flow in communication with said first and second chambers; and
    another magnet disposed in said third chamber so as to attract chips in oil flowing in said third chamber.

11. A housing for an axle driving apparatus according to claim 10, further comprising an iron seat for settling said other magnet in said third chamber.

12. A housing for an axle driving apparatus according to claim 11, further comprising:
    a first communicating bore for communicating said first chamber with said third chamber; and
    a second communicating bore for communicating said second chamber with said third chamber, wherein said third chamber is provided on an upper wall of said housing and said seat is mounted on a bottom of said third chamber.

* * * * *